(No Model.)
R. C. POPE.
HOOP COUPLING AND TIGHTENER.
No. 393,262. Patented Nov. 20, 1888.
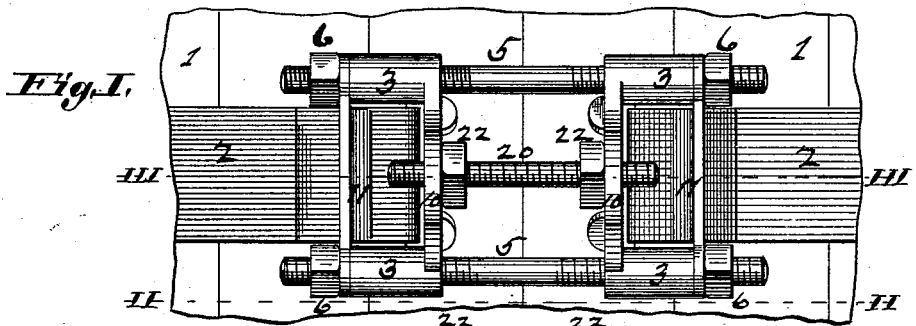
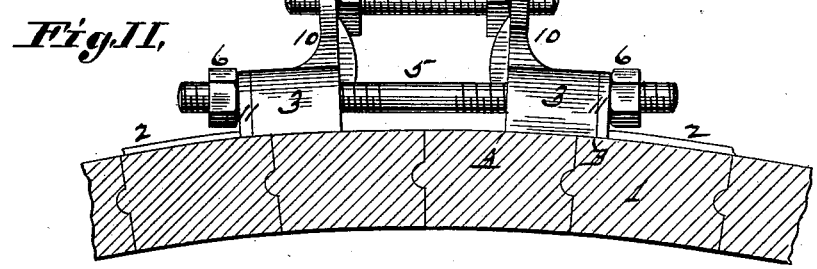
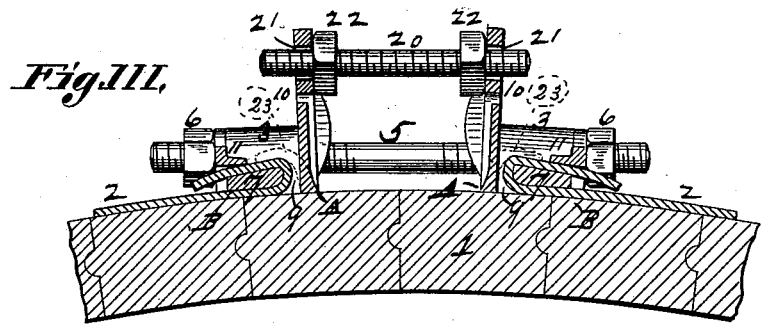
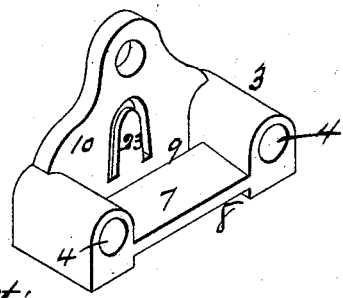
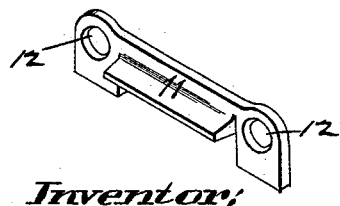
Attest:
E. Arthur,
H. S. Knight
Inventor:
R. C. Pope.
By Knight Bros.
Attys.

United States Patent Office.

RICHARD C. POPE, OF ST. LOUIS, MISSOURI.

HOOP COUPLING AND TIGHTENER.

SPECIFICATION forming part of Letters Patent No. 393,262, dated November 20, 1888.

Application filed January 3, 1888. Serial No. 259,596. (No model.)

*To all whom it may concern:*

Be it known that I, RICHARD C. POPE, of the city of St. Louis, in the State of Missouri, have invented a certain new and useful Improvement in Hoop Couplings and Tighteners, of which the following is a full, clear, and exact description, reference being had to the accompanying drawings, forming part of this specification, and in which—

Figure I shows my improved tightener in front view or elevation, and shows part of a tank or tub. Fig. II is a section through the tank or tub, taken on line II II, Fig. I. Fig. III is a section taken on line III III, Fig. I. Fig. IV is an enlarged perspective view of one of the head-castings, to which one end of the hoop is attached. Fig. V shows the binding-plate.

My invention relates to a device for tightening and holding hoops on large tanks or tubs; and my invention consists in features of novelty hereinafter fully described, and pointed out in the claims.

Referring to the drawings, 1 represents part of a large tank or tub, and 2 one of the hoops.

3 represents duplicate heads, each provided with holes 4, through which pass tie-bolts 5, with tightening-nuts 6. One end of the hoop is secured to one of these heads and the other to the other head, and by tightening on the nuts 6 the hoop will be drawn tightly and held on the tank or tub.

For the purpose of securing the ends of the hoop to the heads each head is provided with a bar, 7, under which the hoop is passed in a recess, 8, beneath each bar. The hoop is then passed up through a recess or opening, 9, behind each bar, or between each bar and the portion 10 of each head. The hoop is next bent down upon the bar, as shown in Fig. III, and a binding-plate, 11, having holes 12 to receive the bolts 5, is then forced over the end of the hoop, as shown in Fig. III, by turning the nuts 6, and the ends of the hoop are thus firmly secured to the respective heads. It will be understood that the hoop is thus secured to the heads before placing the hoop on the tank or tub. I then tighten up the nuts 6 to force the plates 11 over the ends of the hoop, and then (by the further turning of the nuts) the heads 3 are made to approach each other and the hoop is tightened upon the tank or tub.

It will be observed that the upper faces of the bars 7 are inclined, the bars being the thinnest at their outer edges. The consequence is that when the plates 11 are forced inward these pieces securely bind the ends of the hoop between them and the bars, and these pieces 7 and 11 hold the hoop by frictional contact without the use of rivets, which would impair the strength of the hoop.

The tank or tub being round, it is desirable to provide some means of holding the face of the heads in contact with the tank or tub at their outer corners, B, as well as their inner corners, A. To accomplish this I pass a threaded bolt, 20, through perforations 21 in the upper ends of the parts 10 of the heads, and place nuts 22 on the bolt inside of the heads. By turning outward on these nuts the upper ends of the parts 10 of the heads are held apart, and the faces of the heads next the tank bear on the tank from A to B, compelling the faces of the heads to fit the tank.

23 is a tongue, which, when the head is made of malleable or wrought iron, may be bent down cold upon the hoop and serve as an additional means of holding the same. This position of the tongue is indicated by broken lines in Fig. III.

I claim as my invention—

1. In a hoop-tightener, the heads 3 and tie-bolts 5, the heads being provided with bars 7, around which the ends of the hoops are adapted to be bent, and means for holding the ends of the hoops on the bars, substantially as set forth.

2. In a hoop-tightener, the combination of the heads and the bolts, each of which heads and bolts carries frictional contact-pieces, between which the ends of the hoops are adapted to be bound, substantially as set forth.

3. In a hoop-tightener, the combination of the heads provided with bars 7, and portions 10, tie-bolts 5, means for holding the hoop to the bars, adjusting-bolt 20, and nuts 22 thereon, substantially as and for the purpose set forth.

4. In a hoop-tightener, the combination of the heads having bars 7, tie-bolts 5, and plates 11, the plates adapted to fit over the tie-bolts and hold the hoop on the bars, substantially as and for the purpose set forth.

5. In a hoop-tightener, the combination of the heads provided with tapering bars 7, tie-bolts 5, and plates 11, all arranged and operating substantially as and for the purpose set forth.

6. The combination, in a hoop-tightener, of the heads provided with bars 7, tie-bolts 5, plates 11, and tongues 23, all arranged and operating substantially as and for the purpose set forth.

RICHARD C. POPE.

Witnesses:
SAML. KNIGHT,
EDWD. S. KNIGHT.